(12) United States Patent
Suzuki et al.

(10) Patent No.: US 8,714,319 B2
(45) Date of Patent: May 6, 2014

(54) DISK BRAKE

(75) Inventors: Shinji Suzuki, Minami-ALPS (JP); Satoru Tsurumi, Minami-ALPS (JP); Nobuhiro Wakabayashi, Minami-ALPS (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 137 days.

(21) Appl. No.: 13/553,163

(22) Filed: Jul. 19, 2012

(65) Prior Publication Data

US 2013/0025982 A1 Jan. 31, 2013

(30) Foreign Application Priority Data

Jul. 28, 2011 (JP) ................................. 2011-165538

(51) Int. Cl.
*F16D 65/00* (2006.01)

(52) U.S. Cl.
USPC .................. 188/250 E; 188/73.37; 188/205 A

(58) Field of Classification Search
CPC . F16D 65/95; F16D 65/0971; F16D 65/0006; F16D 65/092
USPC ........... 188/73.35–73.37, 250 B, 250 E, 72.5, 188/73.31, 205 A, 205 R
See application file for complete search history.

(56) References Cited

U.S. PATENT DOCUMENTS

| 3,113,643 | A | * | 12/1963 | Botterill | ...................... 188/72.5 |
| 3,918,555 | A | * | 11/1975 | Rath | .......................... 188/73.37 |
| 4,027,752 | A | * | 6/1977 | Brix | ............................. 188/73.32 |
| 4,093,045 | A | * | 6/1978 | Kawamura | .................. 188/73.37 |
| 4,155,430 | A | * | 5/1979 | Kawamura | .................. 188/73.37 |
| 8,348,025 | B2 | * | 1/2013 | Arbesman et al. | ......... 188/73.36 |
| 2004/0035651 | A1 | * | 2/2004 | Renauld | ....................... 188/73.37 |

FOREIGN PATENT DOCUMENTS

JP 10-122277 5/1998

* cited by examiner

*Primary Examiner* — Melanie Torres Williams
(74) *Attorney, Agent, or Firm* — Wenderoth, Lind & Ponack, L.L.P.

(57) ABSTRACT

A shim plate is provided at the rear side of a friction pad to abut annular contact parts of pistons. The shim plate is provided with first and second one-side cut portions and at a position corresponding to the annular contact part of a disk rotational entrance-side piston, for example, so that the area of contact between the shim plate and the annular contact part is larger at the disk rotational exit side than at the disk rotational entrance side. The first and second one-side cut portions and have four contact ends at which the peripheries of the cut portions and the annular contact part intersect each other. At least two of the four contact ends are provided on the disk rotational entrance side with respect to the diametrical center of the piston.

16 Claims, 8 Drawing Sheets ns to a disk brake for use in a
DISK BRAKE

BACKGROUND OF THE INVENTION

The present invention relates to a disk brake for use in a vehicle, for example, an automobile, to apply braking force thereto.

In general, a disk brake used in a vehicle, e.g. an automobile, has a caliper body extending over the outer periphery of and in the axial direction of a disk that rotates together with a wheel of the vehicle, a piston projectable from the caliper body in the axial direction of the disk and having an annular contact part at an end thereof at which the piston is projectable, and a friction pad that is pressed against the disk by the piston (for example, see Japanese Patent Application Publication No, Hei 10-122277).

When the driver of the vehicle, for example, operates the brake, the piston is slidingly displaced toward the disk by a hydraulic pressure supplied externally, for example. Thus, the piston presses the friction pad toward the disk, thereby applying braking force to the disk.

Incidentally, the load (surface pressure) applied to the disk from the friction pad during braking is likely to become larger at the entrance side in the rotational direction of the disk (i.e. rotational entrance side) than at the exit side in the rotational direction of the disk (i.e. rotational exit side). In the disk brake of Japanese Patent Application Publication No. Hei 10-122277, a shim plate formed from a metal plate or the like is provided between the rear side of the friction pad and the piston. The shim plate is provided with an elongated cut portion in a region that is abutted by the annular contact part of the piston to adjust, by the cut portion, the surface pressure of the friction pad applied to the disk.

More specifically, the cut portion is provided in the shim plate at a position on the rotational entrance side in the direction of rotation of the disk when the vehicle travels forward to reduce the load at the position where the cut portion is provided. With this structure, the load from the annular contact part of the piston can be transmitted to the friction pad through the shim plate such that a reduced load is applied to the rotational entrance side of the friction pad. Accordingly, it is possible to suppress uneven wear of the friction pad (lining thereof) and occurrence of brake noise or judder.

However, when the external size (diameter) of the piston (annular contact part) is smaller than the diametrical length and circumferential length of the shim plate, for example, if an elongated cut portion is merely provided in the shim plate, the piston may tilt about the peripheral edge of the cut portion serving as a fulcrum.

In such a case, the load from the piston concentrates on a portion of the shim plate that serves as a fulcrum of tilting, so that the load applied to the friction pad from the piston may become non-uniform. Consequently, the friction pad is likely to wear unevenly, and judder may occur with time.

The present invention has been made in view of the above-described problems with the related art. Accordingly, an object of the present invention is to provide a disk brake capable of reducing brake noise, uneven wear or the friction pad, occurrence of judder, and so forth to improve performance.

SUMMARY OF THE INVENTION

To solve the above-described problem, the present invention is applied to a disk brake having a caliper body extending over the outer periphery of a disk that rotates together with a wheel of a vehicle, a piston projectable from the caliper body in the axial direction of the disk and having an annular contact part at an end thereof at which the piston is projectable, a friction pad that is pressed against the disk by the piston, and a shim plate provided at the rear side of the friction pad to abut the annular contact part. The diameter of the annular contact part is smaller than the diametrical length and circumferential length of the shim plate.

The present invention features a structure in which the shim plate is provided with cut portions so that the area of contact between the shim plate and the annular contact part is larger at a disk rotational exit side than at a disk rotational entrance side in the direction of rotation of the disk when the vehicle travels forward. The cut portions have at least four contact ends at which the peripheries of the cut portions and the annular contact part intersect each other. At least two of the at least four contact ends are provided on the disk rotational entrance side of the shim plate with respect to the diametrical center of the piston.

Advantageous Effects of Invention

It is possible according to the present invention to reduce brake noise, uneven wear of the friction pad, judder, and so forth to improve performance.

DESCRIPTION OF EMBODIMENTS

Figure 1:
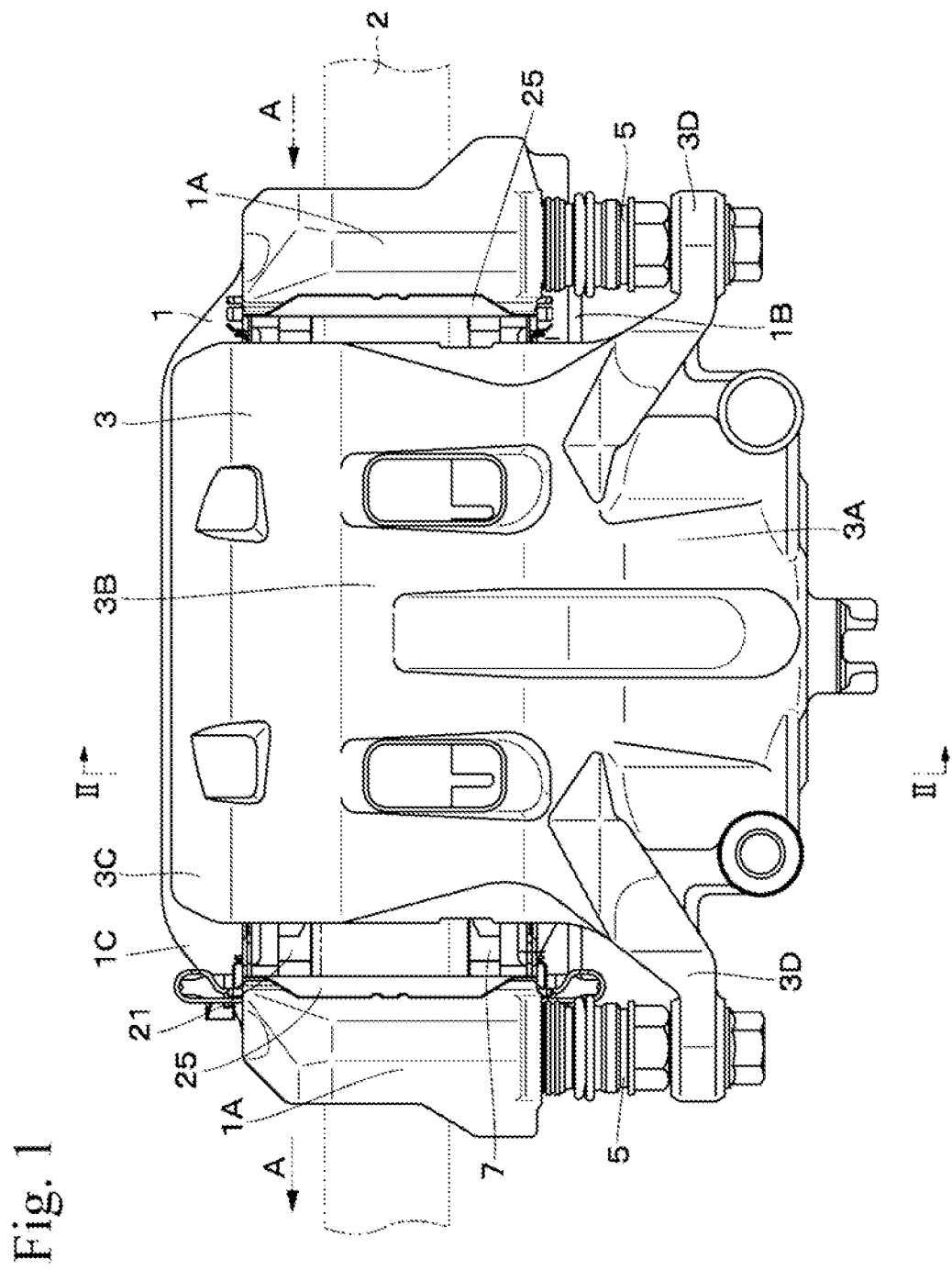
FIG. 1 is a plan view of a disk brake according to a first embodiment of the present invention.

Embodiments of the present invention will be explained below in detail with reference to the accompanying drawings in regard to a disk brake mounted on a vehicle, e.g. an automobile, by way of example.

[First Embodiment]

FIGS. 1 to 7 show a first embodiment of the present invention. In the figures, reference numeral 1 denotes a mounting member (carrier) constituting a base part of a disk brake. The mounting member 1 is integrally secured to a non-rotating part (not shown) of a vehicle at the inner side of a disk 2 that rotates together with a wheel of the vehicle.

Figure 3:
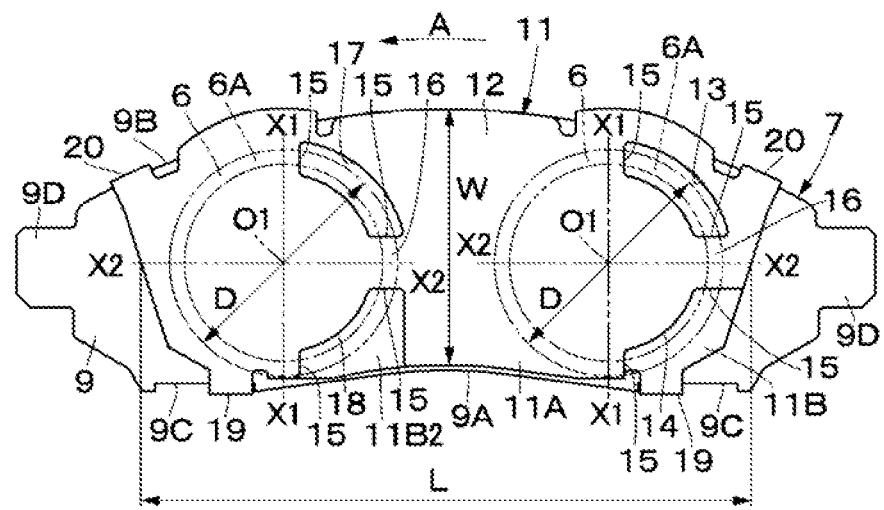
FIG. 3 is a front view of an inner friction pad and an inner shim plate as seen from the inner side (right side in FIG. 2).
Figure 4:
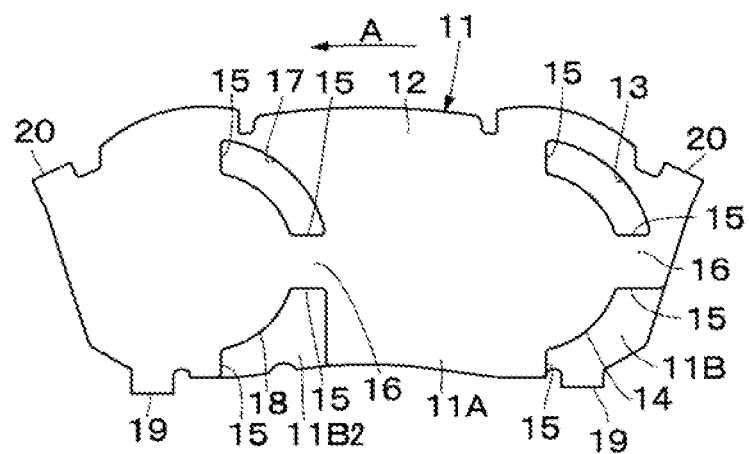
FIG. 4 is a front view similar to FIG. 3, showing the shim plate as seen from the inner side.
Figure 5:
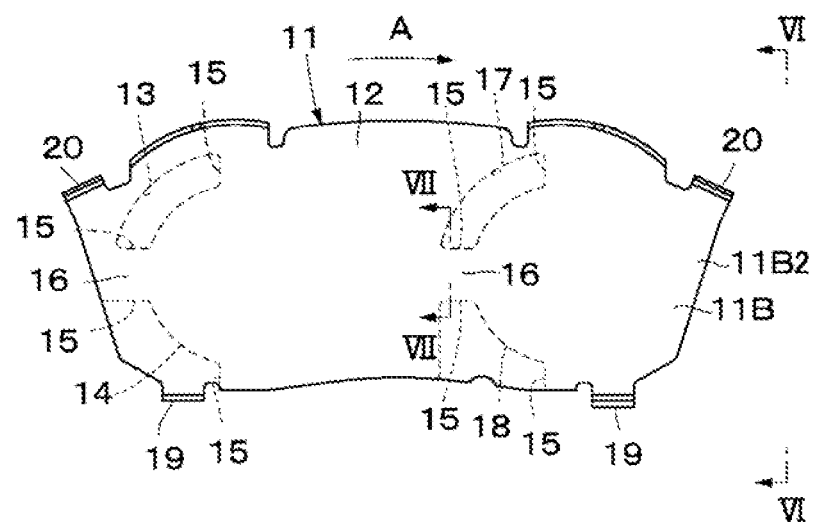
FIG. 5 is a rear view of the shim plate as seen from the rear side of FIG. 4.
Figure 6:
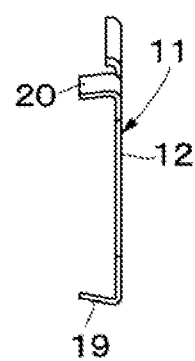
FIG. 6 is a side view of the shim plate as seen from the direction of the arrow VI-VI in FIG. 5.

The disk 2 rotates in the direction of the arrow A in FIGS. 1 and 3 when the vehicle travels forward, for example. The upper side in FIG. 1 and the right side in FIG. 3 are the entrance side in the direction of rotation of the disk 2 (i.e. rotational entrance side), and the lower side in FIG. 1 and the left side in FIG. 3 are the exit side in the direction of rotation of the disk 2 (rotational exit side).

The mounting member 1 substantially comprises a pair of arm portions 1A, a support portion 1B, and a reinforcing beam 1C. The pair of arm portions 1A are spaced apart from each other in the rotational direction (circumferential direction) of the disk 2 and extend over the outer periphery of the disk 2 in the axial direction of the disk 2. The support portion 1B is a thick-walled portion connecting together the proximal ends of the arm portions 1A into an integral structure and secured to a non-rotating part of the vehicle at the inner side of the disk 2. The reinforcing beam 1C extends in the circumferential direction of the disk 2 and connects together the distal ends of the arm portions 1A at the outer side of the disk 2.

Each arm portion 1A is provided with U-shape recessed pad guides (not shown) at the inner and outer sides, respectively, of the disk 2. The pad guides cooperate with pad springs 25 (described later) to guide friction pads 7 and 21 in the axial direction of the disk 2.

The mounting member 1 has a caliper body 3 slidably supported thereon. The caliper body 3 extends over the outer periphery of the disk 2. The caliper body 3 comprises an inner leg portion 3A, a bridge portion 3B, an outer leg portion 3C, and two mounting portions 3D. The inner leg portion 3A is formed so as to be disposed at the inner side of the disk 2. The bridge portion 3B extends over the outer periphery of the disk 2 from the inner leg portion 3A to the outer side of the disk 2. The outer leg portion 3C is disposed at the outer side of the disk 2, extending from the distal end of the bridge portion 3B inward in the radial direction of the disk 2. The outer leg portion 3C has a forked claw portion at the distal end thereof (see FIG. 1). The two mounting portions 3D project from the inner leg portion 3A toward both sides in the rotational direction of the disk 2.

Figure 2:
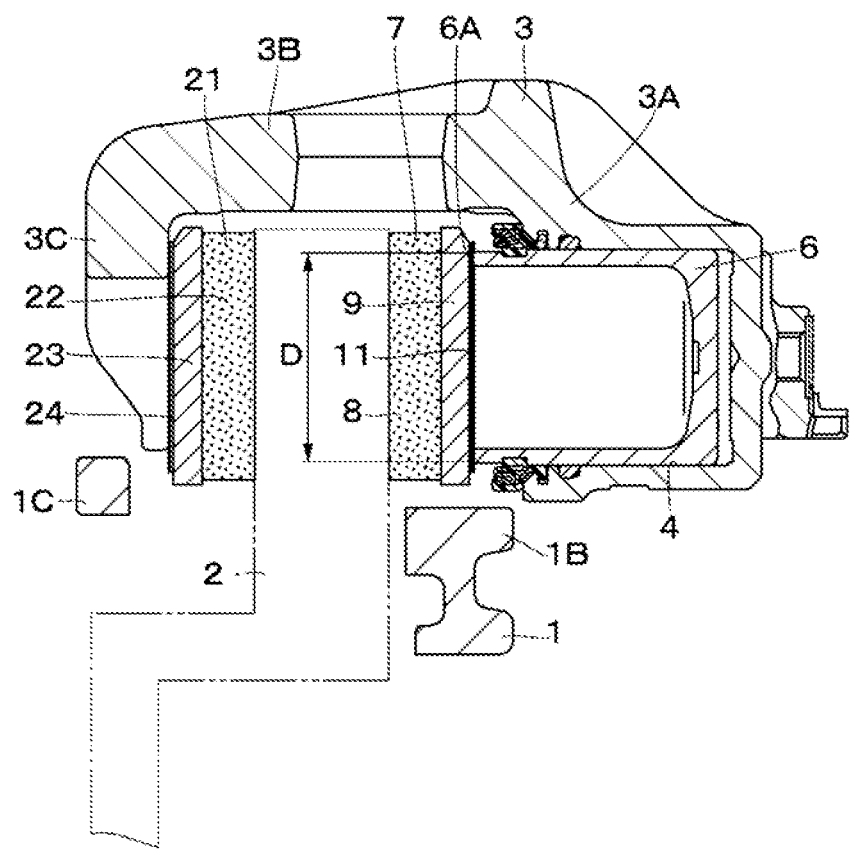
FIG. 2 is a vertical sectional view of the disk brake as seen from the direction of the arrow II-II in FIG. 1.

The inner leg portion 3A is provided therein with, for example, two cylinders 4 (only one of them is shown in FIG. 2) juxtaposed in the rotational direction of the disk 2. Each cylinder 4 has a piston 6 (described later) slidably fitted therein. The mounting portions 3D are secured to the arm portions 1A, respectively, of the mounting member 1 by using sliding pins 5 (see FIG. 1). Thus, the caliper body 3 is slidable in the axial direction of the disk 2.

Two (for example) pistons 6 are provided in the inner leg portion 3A of the caliper body 3 so as to be projectable from the inner leg portion 3A in the axial direction of the disk 2. The pistons 6 are slidably fitted in the cylinders 4, respectively, of the caliper body 3. Each piston 6 is formed in the shape of a circular cylinder, one end of which is closed, and has an annular contact part 6A at a projectable end thereof at which the piston 6 is projectable. The annular contact part 6A abuts (contacts) a shim plate 11 (described later). The pistons 6 are juxtaposed and spaced from each other in the rotational direction of the disk 2 as shown by the two-dot chain lines in FIG. 3.

In this case, as shown in FIG. 3, the diameter (external size) D of the annular contact part 6A is smaller than the diametrical length W and circumferential length L of a shim plate 11 (described later). In other words, the annular contact part 6A of each piston 6 has a size at which the contact part 6A lies within (does not extend beyond) the outer edge (peripheral edge) of a backing plate 9 of an inner friction pad 7 (described later). The pistons 6 press the inner friction pad 7 against the disk 2 in response to the supply of brake fluid pressure into the cylinders 4.

That is, when a brake fluid pressure is supplied into the cylinders 4 during braking, the pistons 6 move, and the annular contact parts 6A of the pistons 6 press the inner friction pad 7 against the disk 2. At this time, the caliper body 3 is displaced toward the inner side by counterforce to the pressing force from the pistons 6. Consequently, the outer leg portion 3C presses the outer friction pad 21 against the disk 2. Thus, the friction pads 7 and 21 are pressed against both sides of the disk 2 to apply braking force to the vehicle.

The inner friction pad 7 is provided between the inner leg portion 3A of the caliper body 3 (i.e. the pistons 6) and the disk 2. The friction pad 7 is pressed against the disk 2 by the pistons 6 when the brake is activated (operated) to apply braking force to the vehicle in cooperation with the outer friction pad 21.

The friction pad 7 comprises a lining $ that comes in frictional contact with the disk 2, and a backing plate 9 secured to the back surface of the lining 8. The backing plate 9 has an oblong, substantially sectorial configuration extending in the rotational direction (circumferential direction) of the disk 2. The inner periphery of the backing plate 9 is provided with an inner peripheral surface 9A having a substantially circular-arc-shaped configuration (substantially circular cylindrical configuration) extending in both the axial and circumferential directions of the disk 2. The outer periphery of the backing plate 9 is provided with an outer peripheral surface 9B similar to the inner peripheral surface 9A.

In this case, the diameter (external size) D of the annular contact part 6A of each piston 6 is set to a size at which the annular contact part 6A lies in between the inner and outer peripheral surfaces 9A and 9B of the backing plate 9. The inner peripheral surface 9A is provided with, for example, two mounting grooves 9C spaced from each other in the rotational direction of the disk 2. The mounting grooves 9C are engaged with inner claw portions 19 of a shim plate 11 (described later).

The backing plate 9 has rectangular lug portions 9D projecting from the opposite ends in the circumferential direction thereof. The lug portions 9D of the backing plate 9 are Fitted in the pad guides of the mounting member 1 through pad springs 25 (described later), thereby allowing the friction pad 7 to be supported by the pad guides slidably in the axial direction of the disk 2 between the arm portions 1A. In this state, the pistons 6 abut the back surface of the backing plate 9 through a shim plate 11 (described later).

The following is an explanation of an inner shim plate 11 provided at the rear side of the backing plate 9.

An inner shim plate 11 is disposed at the rear side of the friction pad 7 to lie between the backing plate 9 of the friction pad 7 and the pistons 6. The shim plate 11 abuts the annular contact parts 6A of the pistons 6. The shim plate 11 adjusts the distributed load from the pistons 6 during braking to allow the friction pad 7 to apply a reasonable surface pressure to the disk 2, thereby suppressing uneven wear of the friction pad 7, brake noise, and so forth.

Figure 7:
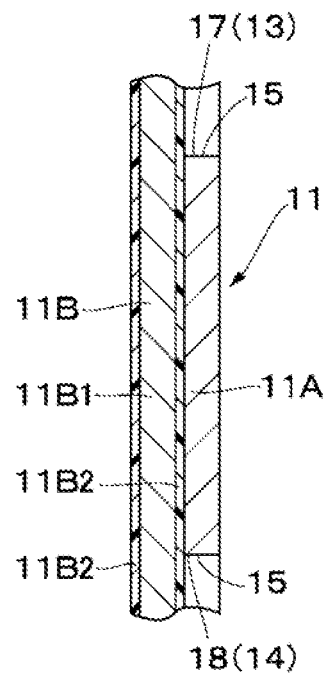
FIG. 7 is a sectional view of the shim plate as seen from the direction of the arrow VII-VII in FIG. 5.

The shim plate 11 is, as shown in FIG. 7, a stacked shim plate formed by bonding (securing) together a metal shim 11A as an outer shim plate member and an elastic shim 11B as an inner shim plate member. The metal shim 11A is formed by a metal plate, e.g. a steel plate (stainless steel plate). The elastic shim 11B is formed by coating both sides of a metal plate 11B1, e.g. a steel plate (stainless steel plate), with an elastic material 11B2, e.g. a hard rubber material or a resin material. It should be noted that the above-described materials and arrangements of the shims 11A and 11B constituting the shim plate 11 are shown by way of example. The shim plate 11 may be formed by using a metal shim as an inner shim plate member and an elastic shim as an outer shim plate member in opposite relation to the above, or using a plurality of shims of the same material, or using three or more shims, provided that a shim having cut portions (described later) forms a side (outer side) of the shim plate 11 that abuts the pistons 6 or the outer leg portion 3C. Further, although the above-described shim plate 11 is formed by bonding together the metal shim 11A and the elastic shim 11B, the metal shim 11A and the elastic shim 11B may be superimposed on one another without being bonded together. In such a case, the metal shim 11A and the elastic shim 11B are each provided with claw portions (described later) for engagement with the backing plate 9.

The shim plate 11 is disposed between the pistons 6 and the friction pad 7 so that the metal shim 11A forming a reverse (outer) side faces the annular contact parts 6A of the pistons 6 and that the elastic shim 11B forming an obverse (inner) side faces the backing plate 9 of the friction pad 7. The shim plate 11, which is formed by securing together the metal shim 11A and the elastic shim 11B, as a whole, substantially comprises an abutting plate portion 12, inner claw portions 19, and outer claw portions 20 (described later).

The abutting plate portion 12 constitutes the body portion of the shim plate 11. The abutting plate portion 12 is formed in the shape of a flat plate, for example, and extends in a longitudinal direction with an oblong, substantially sectorial configuration, where the longitudinal direction is the rotational direction (direction of the arrow A) of the disk 2. The obverse surface of the abutting plate portion 12 (i.e. the inner surface of the abutting plate portion 12, that is, the elastic shim 11B side surface) abuts the reverse surface of the backing plate 9 in superimposed manner. The reverse surface of the abutting plate portion 12 (i.e. the outer surface of the abutting plate portion 12, that is, the metal shim 11A side surface) is abutted by the annular contact parts 6A of the pistons 6. The abutting plate portion 12 is provided with a set of first and second one-side cut portions 13 and 14 and a set of first and second other-side cut portions 17 and 18 at respective positions corresponding to the annular contact parts 6A of the pistons 6.

The first and second one-side cut portions 13 and 14 are provided in the abutting plate portion 12 at a position corresponding to the piston 6 located at the rotational entrance side (right side in FIG. 3), which is the entrance side in the rotational direction of the disk 2. The first and second one-side cut portions 13 and 14 are disposed on the rotational entrance side of a region of the abutting plate portion 12 that corresponds to the annular contact part 6A of the rotational entrance-side piston 6, i.e. as shown in FIG. 3, on the rotational entrance side of a line segment X1-X1 extending in the diametrical direction of the disk 2 through the diametrical center O1 of the rotational entrance-side piston 6.

The first and second one-side cut portions 13 and 14 are provided, as shown in FIG. 7, by forming through-holes or cut-out portions in the metal shim 11A constituting the shim plate 11. More specifically, the first one-side cut portion 13 is formed in the metal shim 11A as a substantially circular arc-shaped through-hole having a circumferential dimension of from 70 to 85 degrees with respect to the circumferential direction of the annular contact part 6A. The second one-side cut portion 14 is formed in the metal shim 11A as a substantially circular arc-shaped cut-out portion having a circumferential dimension of from 70 to 85 degrees with respect to the circumferential direction of the annular contact part 6A.

The first and second one-side cut portions 13 and 14 allow local gaps to exist between the annular contact part 6A of the piston 6 and the abutting plate portion 12 of the shim plate 11 (i.e. between the annular contact part 6A and the elastic shim 11B), thereby adjusting the surface pressure oldie piston 6 applied to the friction pad 7 to prevent uneven wear of the friction pad 7 and other problems during braking.

The first and second one-side cut portions 13 and 14 are provided so that the area of contact between the abutting plate portion 12 of the shim plate 11 and the annular contact part 6A of the piston 6 (i.e. the area of contact between the metal shim 11A and the annular contact part 6A) is larger at the disk rotational exit side (left side of the line segment X1-X1 in FIG. 3) than at the disk rotational entrance side (right side of the line segment X1-X1 in FIG. 3) when the vehicle travels forward. Therefore, both the first and second one-side cut portions 13 and 14 are provided on the rotational entrance side (right side of the line segment X1-X1 in FIG. 3) of a region of the abutting plate portion 12 (metal shim 11A) that corresponds to the annular contact part 6A of the piston 6.

The first and second one-side cut portions 13 and 14 are each formed to extend in the shape of a substantially circular arc along the annular contact part 6A of the piston G. Consequently, the first and second one-side cut portions 13 and 14 have four contact ends 15 at which the peripheries (peripheral edges) of the first and second one-side cut portions 13 and 14 and the annular contact part 6A of the piston 6 intersect each other. In this embodiment, all of the four contact ends 15 are located on the rotational entrance side of a region of the abutting plate portion 12 of the shim plate 11 that corresponds to the annular contact part 6A of the piston 6.

The first and second one-side cut portions 13 and 14 are provided on the rotational entrance side (right side of the line segment X1-X1 in FIG. 3) of a region of the abutting plate portion 12 (metal shim 11A) that corresponds to the annular contact part 6A of the piston 6, being spaced from each other in the diametrical direction of the disk 2. More specifically, the first one-side cut portion 13 is provided in a region located outward in the radial direction of the disk 2, i.e. in a region located outer (upper in FIG. 3) in the radial direction of the disk 2 than a line segment X2-X2 perpendicular to the line segment X1-X1 in FIG. 3. The second one-side cut portion 14 is provided in a region located inward in the radial direction of the disk 2, i.e. in a region located inner (lower in FIG. 3) in the radial direction of the disk 2 than the line segment X2-X2 in FIG. 3.

A portion of the abutting plate portion 12 (metal shim 11A) that lies between the inner end (lower end in FIGS. 3 to 5) of the first one-side cut portion 13 and the outer end (upper end in FIGS. 3 to 5) of the second one-side cut portion 14 serves as a partition 16 dividing the first and second one-side cut portions 13 and 14 from each other. The partition 16, as shown in FIG. 3, extends along a line segment X2-X2 passing through the diametrical center of the disk rotational entrance-side piston 6 and perpendicularly intersecting the line segment X1-X1 extending in the diametrical direction of the disk 2. In other words, the partition 16 extends in the longitudinal direction of the friction pad 7.

Thus, of the four contact ends 15, two contact ends 15 located at both sides of the partition 16 face each other across the line segment X2-X2. In other words, the first and second one-side cut portions 13 and 14 are provided at both sides, respectively, of the partition 16, which is a portion abutting the annular contact part 6A, on the rotational entrance side (right side of the line segment X1-X1 in FIG. 3) of a region of the abutting plate portion 12 that corresponds to the annular contact part 6A of the rotational entrance-side piston 6.

Thus, when the brake is activated, the rotational entrance side of the annular contact part 6A of the piston 6 abuts the partition 16, which is a portion of the abutting plate portion 12 of the shim plate 11 that lies between two contact ends 15. Accordingly, despite the fact that the cut portions 13 and 14 are provided in the abutting plate portion 12, the piston 6 can be suppressed from tilting about the peripheral edge of the cut portion 13 or 14.

The first and second other-side cut portions 17 and 18 are provided in the abutting plate portion 12 of the shim plate 11 at a position corresponding to the piston 6 located at the rotational exit side (left side in FIG. 3), which is the exit side in the rotational direction of the disk 2. The first and second other-side cut portions 17 and 18 are disposed on the rotational entrance side or a region of the abutting plate portion 12 of the shim plate 11 that corresponds to the annular contact part 6A of the rotational exit-side piston 6, i.e., as shown in FIG. 3, on the rotational entrance side (right side) of a line segment X1-X1 extending in the diametrical direction of the disk 2 through the diametrical center O1 of the rotational exit-side piston 6.

It should be noted that the first and second other-side cut portions 17 and 18 have the same structure and the same advantageous effects as those of the first and second one-side cut portions 13 and 14, except the difference as to whether the cut portions are provided to correspond to the rotational exit-side piston 6 or the rotational entrance-side piston 6. Therefore, the same constituent elements of the first and second other-side cut portions 17 and 18 as those of the first and second one-side cut portions 13 and 14 are denoted by the same reference numerals as used for the cut portions 13 and 14, and a further explanation thereof is omitted.

Two inner claw portions 19 are provided as integral parts of the abutting plate portion 12 of the shim plate 11 on the inner side of the latter in the radial direction of the disk 2. The inner claw portions 19 are each formed to project from the abutting plate portion 12 inward in the radial direction of the disk 2 and bent in a substantially L-shape toward the associated mounting groove 9C of the backing plate 9. Of the two inner claw portions 19, the inner claw portion 19 that is located on the disk rotational entrance side (right side in FIGS. 3 and 4) is provided on the elastic shim 11B, and the inner claw portion 19 that is located on the disk rotational exit side (left side in FIGS. 3 and 4) is provided on both the metal shim 11A and the elastic shim 11B. The inner claw portions 19 are engaged with the respective mounting grooves 9C of the backing plate 9 with an appropriate interference in the state of being elastically deformed away from the mounting grooves 9C.

Two outer claw portions 20 are provided as integral parts of the abutting plate portion 12 of the shim plate 11 on the outer side of the latter in the radial direction of the disk 2. The outer claw portions 20 are each formed to project from the abutting plate portion 12 outward in the radial direction of the disk 2 and bent in a substantially L-shape toward the outer peripheral surface 9B of the backing plate 9. The outer claw portions 20 are provided on both the metal shim 11A and the elastic shim 11B. The outer claw portions 20 are engaged with the outer peripheral surface 9B of the backing plate 9 with an appropriate interference in the state of being elastically deformed away from the outer peripheral surface 9B.

An outer friction pad 21 (see FIGS. 1 and 2) is provided between the outer leg portion 3C of the caliper body 3 and the disk 2. The friction pad 21 has substantially the same structure as the inner friction pad 7. That is, the outer friction pad 21 comprises a lining 22 and a backing plate 23 and is pressed against the disk 2 by the outer leg portion 3C when the brake is activated. An outer shim plate 24 (see FIG. 2) is provided at the rear side of the backing plate 23.

A pair of pad springs 25 are provided in the pad guides, respectively, of the mounting member 1 to guide the friction pads 7 and 21 (the lug portions 9D of the backing plate 9) axially in the pad guides.

The following is an explanation of the operation of the disk brake according to this embodiment arranged as stated above.

When the driver of the vehicle or the like operates the brake, a brake fluid pressure is supplied into the cylinders 4 in the caliper body 3, causing the pistons 6 to be displaced toward the inner friction pad 7. Consequently, the pistons 6 press the friction pad 7 against the disk 2 through the shim plate 11, and the caliper body 3 is displaced toward the inner side by counterforce from the disk 2. As a result, the outer leg portion 3C of the caliper body 3 presses the friction pad 21 against the disk 2 through the outer shim plate 24. Accordingly, pressing force can be applied to the disk 2 from both sides thereof by the friction pads 7 and 21, thereby applying braking force to the vehicle.

When the brake is activated (operated) as stated above, the pressing force of each piston 6 is transmitted to the friction pad 7 through the shim plate 11. At this time, despite the fact that the shim plate 11 is provided with the cut portions 13 and 14 (17 and 18), it is possible to suppress the pistons 6 from tilting about the peripheral edge of the cut portion 13 or 14 (17 or 18) because the rotational entrance side (right side of the line segment X1-X1 in FIG. 3) of the annular contact part 6A of each piston 6 abuts the partition 16. Thus, it is possible to transmit the load from each piston 6 to the friction pad 7 through the shim plate 11 such that a reduced load is applied to the disk rotational entrance side of a region of the friction pad 7 that corresponds to the piston 6, and hence possible to reduce brake noise, uneven wear of the friction pad, judder, and so forth to improve performance.

That is, according to this embodiment, at least two of the contact ends 15 of the first and second cut portions 13 and 14 (17 and 18), i.e. contact ends 15 located at both sides of the partition 16, are provided on the rotational entrance side of the shim plate 11 in the direction of rotation of the disk 2 when the vehicle travels forward. Consequently, when the brake is activated, the partition 16, which is a portion of the shim plate 11 lying between the two contact ends 15, and the annular contact part 6A of the piston 6 abut each other, thereby suppressing tilting of the piston 6.

Further, according to this embodiment, two pistons 6 are provided in the caliper body 3, and a set of first and second cut portions 13 and 14 (17 and 18) are provided for each piston 6 (corresponding to each piston 6). Accordingly, even in a structure in which two pistons 6 are provided in the caliper body 3, tilting of either of the two pistons 6 can be suppressed by the cut portions 13 and 14 (17 and 18).

Moreover, according to this embodiment, the first and second cut portions 13 and 14 (17 and 18) are provided at both sides, respectively, of the partition 16 corresponding to a portion of the shim plate 11 that abuts the annular contact part 6A of the piston 6 at the rotational entrance side of the annular contact part 6A. Accordingly, the annular contact part 6A of the piston 6 and the partition 16 surely abut each other when the brake is activated.

In addition, the distribution of load applied to the disk 2 from the friction pad 7 (i.e. surface pressure distribution) can be adjusted (tuned) over a wide range by properly setting the size of the first and second cut portions 13 and 14 (17 and 18), i.e. by properly setting the circumferential dimension of the partition 16. Accordingly, tilting of the pistons 6 can be suppressed also from this point of view.

Thus, it is possible according to this embodiment to suppress tilting of the pistons 6. Therefore, it is possible to transmit the load from each piston 6 to the friction pad 7 such that a reduced load is applied to the disk rotational entrance side of a region of the friction pad 7 that corresponds to the piston 6. As a result, it is possible to reduce brake noise, uneven wear of the friction pad 7, judder, and so forth and hence possible to improve the brake performance, durability and stability of the disk brake.

[Second Embodiment]

Figure 8:
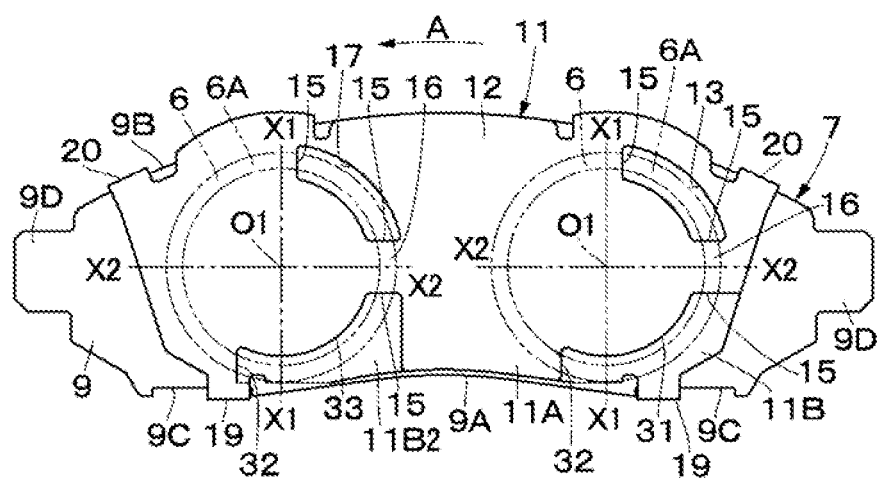
FIG. 8 is a front view similar to FIG. 3, showing an inner friction pad and an inner shim plate according to a second embodiment of the present invention as seen from the inner side.

FIG. 8 shows a second embodiment of the present invention. The feature of the second embodiment resides in that a cut portion is provided in a shim plate such that a part of the cut portion extends to the disk rotational exit side of a region of the shim plate that corresponds to an annular contact part of a piston. It should be noted that, in this embodiment, the same constituent elements as those of the foregoing first embodiment are denoted by the same reference numerals as used in the first embodiment, and a description thereof is omitted.

A second one-side cut portion 31 is provided in a shim plate 11 at a position corresponding to a piston 6 located at the disk rotational entrance side (right side in FIG. 8), and in a region located inward in the radial direction of the disk 2, i.e. in a region located inner (lower in FIG. 8) in the radial direction of the disk 2 than a line segment X2-X2 in FIG. 8. The second one-side cut portion 31 is longer than the second one-side cut portion 14 of the foregoing first embodiment in dimension in the circumferential direction of the annular contact part 6A of the piston 6. More specifically, the second one-side cut portion 31 is formed in the shim plate 11 (metal shim 11A) as a substantially circular arc-shaped cut-out portion having a circumferential dimension of from 95 to 120 degrees with respect to the circumferential direction of the annular contact part 6A.

Thus, the second one-side cut portion 31 is provided so that a part thereof extends to the disk rotational exit side (left side of the line segment X1-X1 in FIG. 8) of the region corresponding to the annular contact part 6A. In other words, of the contact ends 15 and 32 of the second one-side cut portion 31, the contact end 32, which is located inward in the radial direction of the disk 2, extends to the disk rotational exit side of the region corresponding to the annular contact part 6A. Accordingly, oldie four contact ends 15 and 32 of the first and second one-side cut portions 13 and 31, three contact ends 15 are located on the disk rotational entrance side.

In this embodiment also, the first and second one-side cut portions 13 and 31 are provided in the shim plate 11 so that the area of contact between the abutting plate portion 12 of the shim plate 11 and the annular contact part 6A of the piston 6 (i.e. the area of contact between the metal shim 11A and the annular contact part 6A) is larger at the disk rotational exit side than at the disk rotational entrance side, in the same way as in the foregoing first embodiment.

A second other-side cut portion 33 is provided in the shim plate 11 at a position corresponding to a piston 6 located at the disk rotational exit side (left side in FIG. 8), and in a region located inward in the radial direction of the disk 2, i.e. in a region located inner (lower in FIG. 8) in the radial direction of the disk 2 than a line segment X2-X2 in FIG. 8. It should be noted that the second other-side cut portion 33 and the above-described second one-side cut portion 31 have the same structure and the same advantageous effects, except the difference as to whether each cut portion is provided to correspond to the rotational exit-side piston 6 or the rotational entrance-side piston 6. Therefore, the same constituent elements of the cut portion 33 as those of the cut portion 31 are denoted by the same reference numerals as used for the cut portion 31, and a further explanation thereof is omitted.

Thus, the second embodiment arranged as stated above also provides substantially the same advantageous effects as the foregoing first embodiment. According to the second embodiment, in particular, the second cut portions 31 and 33 are made longer in dimension than the second cut portions 14 and 18 in the first embodiment, thereby adjusting the distribution of load applied to the disk 2 from the friction pad 7 (i.e. surface pressure distribution). Accordingly, it is possible to further improve the brake performance, durability and stability of the disk brake.

[Third Embodiment]

Figure 9:
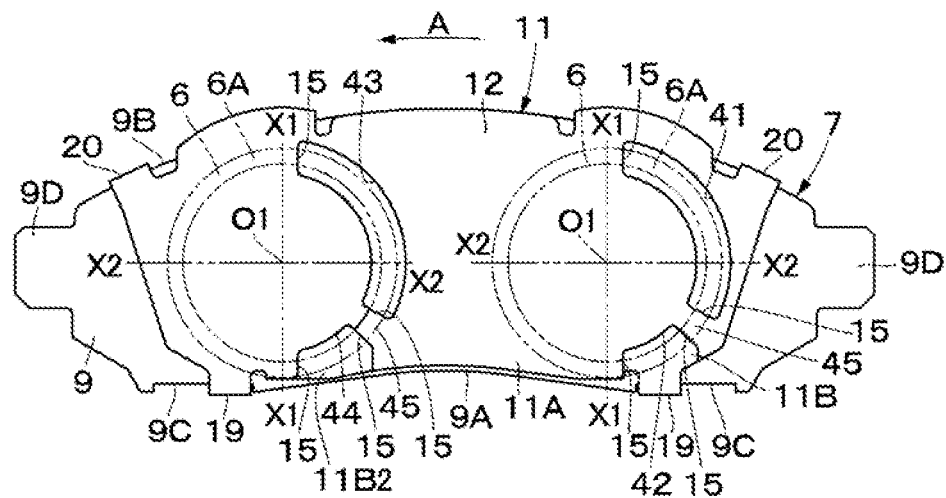
FIG. 9 is a front view similar to FIG. 3, showing an inner friction pad and an inner shim plate according to a third embodiment of the present invention as seen from the inner side.

FIG. 9 shows a third embodiment of the present invention. The feature of the third embodiment resides in that the position of a partition is displaced inward in the radial direction of the disk 2 from a line segment perpendicular to a line segment extending in the diametrical direction of the disk 2 through the diametrical center of an associated piston, i.e. from the longitudinal axis of the friction pad 7. It should be noted that, in this embodiment, the same constituent elements as those of the foregoing first embodiment are denoted by the same reference numerals as used in the first embodiment, and a description thereof is omitted.

First and second one-side cut portions 41 and 42 are provided at a position corresponding to a piston 6 located at the disk rotational entrance side (right side in FIG. 9). First and second other-side cut portions 43 and 44 are provided at a position corresponding to a piston 6 located at the disk rotational exit side (left side in FIG. 9). The first cut portions 41 and 43 are located outward (upper side in FIG. 9) in the radial direction of the disk 2. The first cut portions 41 and 43 are longer than the first cut portions 13 and 17 in the foregoing first embodiment in dimension in the circumferential direction of the annular contact part 6A of each piston 6. More specifically, the circumferential dimension of each of the first cut portions 41 and 43 is set at from 90 to 120 degrees with respect to the circumferential direction of the annular contact part 6A.

The second cut portions 42 and 44 are located inward (lower side in FIG. 9) in the radial direction of the disk 2. The second cut portions 42 and 44 are shorter than the second cut portions 14 and 18 in the first embodiment in dimension in the circumferential direction of the annular contact part 6A of each piston 6. More specifically, the circumferential dimension of each oldie second cut portions 42 and 44 is set at from 10 to 60 degrees with respect to the circumferential direction of the annular contact part 6A.

Thus, the position of a partition 45 dividing the first and second cut portions 41 and 42 from each other and the position of a partitions 45 dividing the first and second cut portions 43 and 44 from each other are displaced from respective line segments X2-X2 perpendicular to line segments X1-X1 extending in the diametrical direction of the disk 2 through the respective diametrical centers O1 of the associated pistons 6. In other words, the positions of the partitions 45 are displaced inward in the radial direction of the disk 2 from the longitudinal axis of the friction pad 7.

Thus, the third embodiment arranged as stated above also provides substantially the same advantageous effects as those of the foregoing first embodiment. According to the third embodiment, in particular, the distribution of load applied to the friction pad 7 is adjusted by adjusting the circumferential dimension of the first cut portions 41 and 43 and the circumferential dimension of the second cut portions 42 and 44. That is, when a high brake fluid pressure is supplied into the cylinders 4 in the caliper body 3, the caliper body 3 is deformed about the joint between the inner leg portion 3A and the bridge portion 3B such that the annular contact part 6A of each piston 6 is oblique to the disk 2, i.e. such that the annular contact part 6A diverges from the disk 2 toward the radially inner side of the disk 2. Accordingly, the load applied to the friction pad 7 from the annular contact part 6A of each piston 6 is larger at the disk-radially outer side of the annular contact part 6A than at the disk-radially inner side thereof. In such a case, the load applied to the friction pad 7 from the disk-radially outer side of the annular contact part 6A can be reduced by displacing the partitions 45 inward in the radial direction of the disk 2 from the longitudinal axis as in this embodiment. Thus, it is possible to suppress uneven wear of the friction pad 7 in the diametrical direction of the disk 2 and hence possible to further improve the brake performance, durability and stability of the disk brake.

[Fourth Embodiment]

Figure 10:
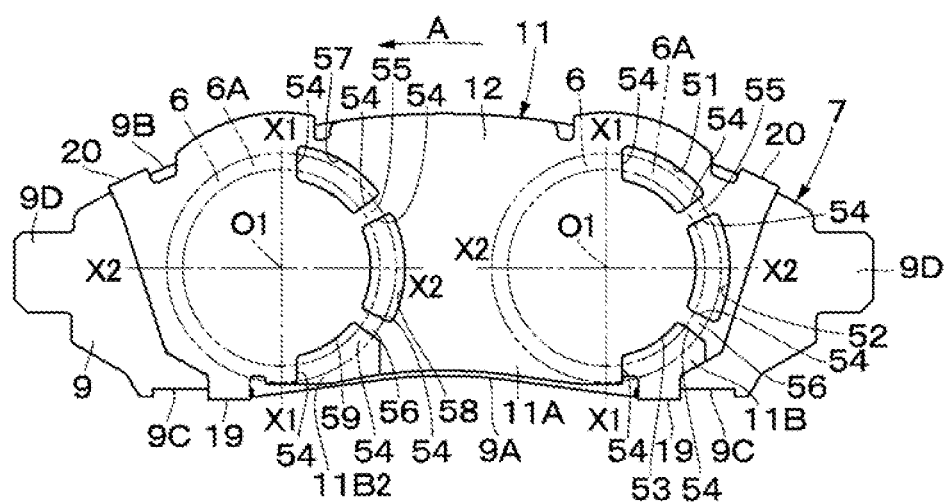
FIG. 10 is a front view similar to FIG. 3, showing an inner friction pad and an inner shim plate according to a fourth embodiment of the present invention as seen from the inner side.

FIG. 10 shows a fourth embodiment of the present invention. The feature of the fourth embodiment resides in that a shim plate 11 is provided with three cut portions on the rotational entrance side of a region corresponding to each piston 6. It should be noted that, in this embodiment, the same constituent elements as those of the foregoing first embodiment are denoted by the same reference numerals as used in the first embodiment, and a description thereof is omitted.

First, second and third one-side cut portions 51, 52 and 53 are provided at a position corresponding to a piston 6 located at the rotational entrance side (right side in FIG. 10), which is the entrance side in the rotational direction of the disk 2. The first, second and third one-side cut portions 51, 52 and 53 are disposed on the rotational entrance side of a region of an abutting plate portion 12 constituting a shim plate 11, which region corresponds to an annular contact part 6A of the rotational entrance-side piston 6, i.e. on the rotational entrance side (right side) of a line segment X1-X1 extending in the diametrical direction of the disk 2 through the diametrical center O1 of the rotational entrance-side piston 6.

The first, second and third one-side cut portions 51, 52 and 53 have six contact ends 54 at which the peripheries (peripheral edges) of the cut portions 51, 52 and 53 and the annular contact part 6A of the piston 6 intersect each other. The six contact ends 54 are located on the rotational entrance side (right side of the line segment X1-X1) of a region of the abutting plate portion 12 that corresponds to the annular contact part 6A of the piston 6.

A portion of the abutting plate portion 12 of the shim plate 11 that lies between the inner end (lower end) of the first one-side cut portion 51 and the outer end (upper end) of the second one-side cut portion 52 serves as a first partition 55 dividing the first and second one-side cut portions 51 and 52 from each other. A portion of the abutting plate portion 12 of the shim plate 11 that lies between the inner end (lower end) of the second one-side cut portion 52 and the outer end (upper end) of the third one-side cut portion 53 serves as a second partition 56 dividing the second and third one-side cut portions 52 and 53 from each other.

First, second and third other-side cut portions 57, 58 and 59 are provided at a position corresponding to a piston 6 located at the rotational exit side (left side in FIG. 10), which is the exit side in the rotational direction of the disk 2. It should be noted that the first, second and third other-side cut portions 57, 58 and 59 and the above-described first, second and third one-side cut portions 51, 52 and 53 have the same structure and the same advantageous effects, except the difference as to whether the cut portions are provided to correspond to the rotational exit-side piston 6 or the rotational entrance-side piston 6. Therefore, the same constituent elements of the first, second and third other-side cut portions 57, 58 and 59 as those of the first, second and third one-side cut portions 51, 52 and 53 are denoted by the same reference numerals as used for the cut portions 51, 52 and 53, and a further explanation thereof is omitted.

The disk brake according to this embodiment reduces brake noise, uneven wear of the friction pad, judder, and so forth by using the shim plate 11 provided with the cut portions 51, 52, 53, 57, 58 and 59 arranged as stated above and has no particular difference in the basic operation from the disk brake according to the foregoing first embodiment.

According to this embodiment, in particular, the abutting plate portion 12 of the shim plate 11 has two partitions 55 and 56 on the rotational entrance side of a region corresponding to the annular contact part 6A of the rotational entrance-side piston 6 and two partitions 55 and 56 on the rotational entrance side of a region corresponding to the annular contact part 6A of the rotational exit-side piston 6. Accordingly, the rotational entrance side of the annular contact part 6A of each piston 6 abuts the two partitions 55 and 56. Consequently, it is possible to suppress the pistons 6 from tilting about the peripheral edge of the cut portion 51, 52, 53, 57, 58 or 59. Thus, it is possible to further reduce brake noise, uneven wear of the friction pad, judder, and so forth.

[Fifth Embodiment]

Figure 11:
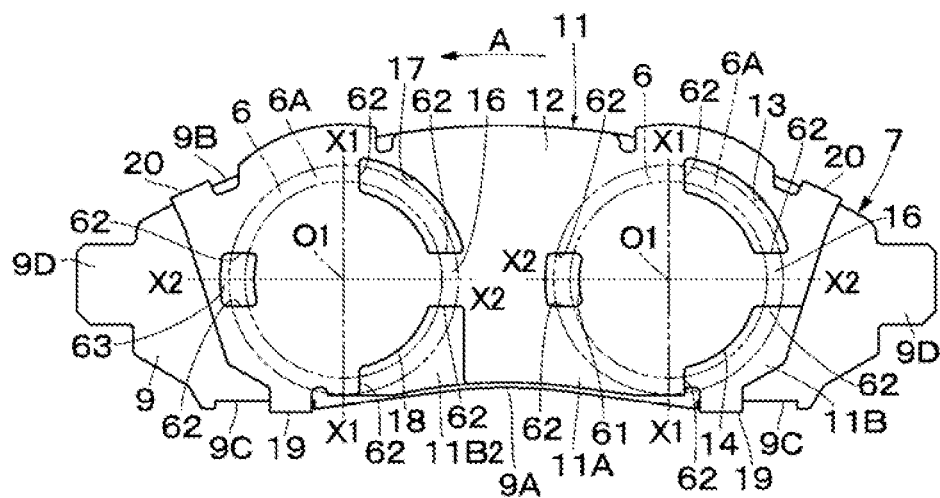
FIG. 11 is a front view similar to FIG. 3, showing an inner friction pad and an inner shim plate according to a fifth embodiment of the present invention as seen from the inner side.

FIG. 11 shows a fifth embodiment of the present invention. The feature of the fifth embodiment resides in that a shim plate is provided with two cut portions on the rotational entrance side of a region corresponding to each piston and one cut portion on the rotational exit side of the region. It should be noted that, in this embodiment, the same constituent elements as those of the foregoing First embodiment are denoted by the same reference numerals as used in the first embodiment, and a description thereof is omitted.

A third one-side cut portion 61 is provided in an abutting plate portion 12 of a shim plate 11 at a position corresponding to a piston 6 located at the rotational entrance side (right side in FIG. 11), which is the entrance side in the rotational direction of the disk 2. The third one-side cut portion 61 is provided on the rotational exit side of a region of the abutting plate portion 12 of the shim plate 11 that corresponds to the annular contact part 6A of the rotational entrance-side piston 6, i.e. on the rotational exit side (left side) of a line segment X1-X1 extending in the diametrical direction of the disk 2 through the diametrical center O1 of the rotational entrance-side piston 6.

The third one-side cut portion 61 is formed in the metal shim 11A as a substantially circular arc-shaped through-hole having a circumferential dimension of from 20 to 40 degrees with respect to the circumferential direction of the annular contact part 6A. The third one-side cut portion 61 is provided at a position on a line segment X2-X2 perpendicular to the line segment X1-X1 extending in the diametrical direction of the disk 2 through the diametrical center O1 of the rotational entrance-side piston 6.

In this embodiment also, the first, second and third one-side cut portions 13, 14 and 61 are provided in the shim plate 11 so that the area of contact between the abutting plate portion 12 of the shim plate 11 and the annular contact part 6A of the piston 6 (i.e. the area of contact between the metal shim 11A and the annular contact part 6A) is larger at the rotational exit side than at the rotational entrance side, as in the foregoing first embodiment.

The first, second and third one-side cut portions 13, 14 and 61 have six contact ends 62 at which the peripheries (peripheral edges) of the cut portions 13, 14 and 61 and the annular contact part 6A of the piston 6 intersect each other. Four of the six contact ends 62 are located on the rotational entrance side (right side of the line segment X1-X1) of a region of the abutting plate portion 12 that corresponds to the annular contact part 6A of the rotational entrance-side piston 6. Two of the six contact ends 62 are located on the rotational exit side (left side of the line segment X1-X1) of the region of the abutting plate portion 12 that corresponds to the annular contact part 6A of the piston 6.

A third other-side cut portion 63 is provided at a position corresponding to a piston 6 located at the rotational exit side (left side in FIG. 11), which is the exit side in the rotational direction of the disk 2. The third other-side cut portion 63 and the above-described third one-side cut portion 61 have the same structure and the same advantageous effects, except the difference as to whether each cut portion is provided to correspond to the rotational exit-side piston 6 or the rotational entrance-side piston 6. Therefore, the same constituent elements of the cut portion 63 as those of the cut portion 61 are denoted by the same reference numerals as used for the cut portion 61, and a further explanation thereof is omitted.

Thus, the fifth embodiment arranged as stated above also provides substantially the same advantageous effects as the foregoing first embodiment. According to the fifth embodiment, in particular, the distribution of load applied to the friction pad 7 (i.e. surface pressure distribution) is adjusted by providing the third cut portions 61 and 63. Accordingly, it is possible to further improve the brake performance, durability and stability of the disk brake.

[Sixth Embodiment]

Figure 12:
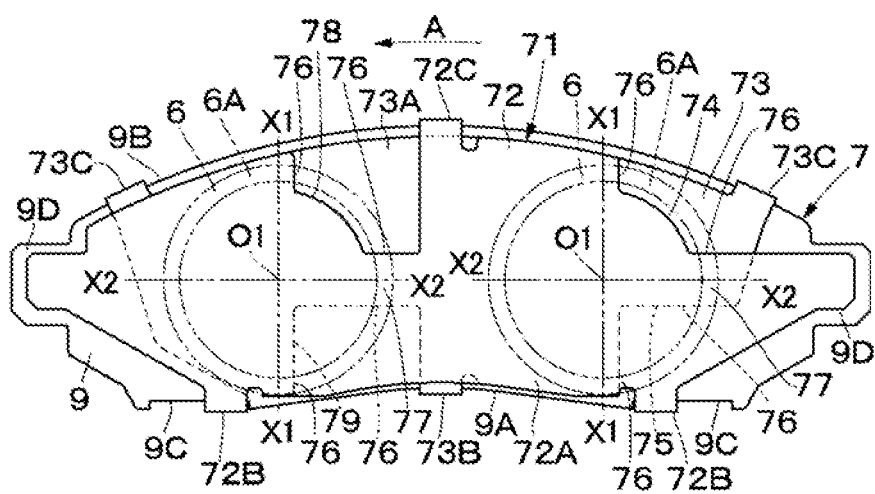
FIG. 12 is a front view similar to FIG. 3, showing an inner friction pad and an inner shim plate according to a sixth embodiment of the present invention as seen from the inner side.
Figure 13:
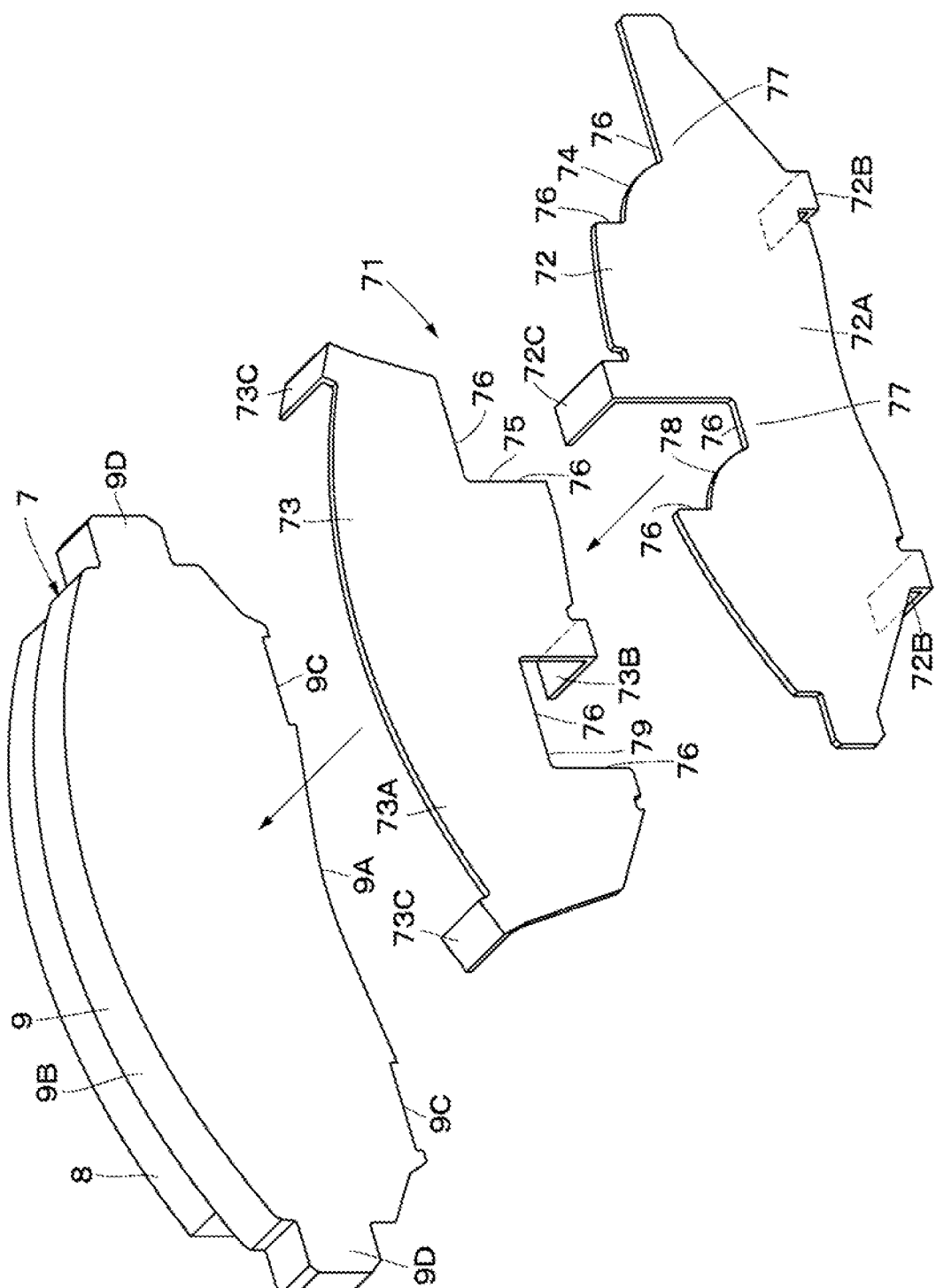
FIG. 13 is an exploded perspective view of the inner friction pad and the inner shim plate shown in FIG. 12.

FIGS. 12 and 13 show a sixth embodiment of the present invention. The feature of the sixth embodiment resides in that a shim plate is formed from two separable shim plate members. It should be noted that, in this embodiment, the same constituent elements as those of the foregoing first embodiment are denoted by the same reference numerals as used in the first embodiment, and a description thereof is omitted.

An inner shim plate 71 is provided at the rear side of an inner friction pad 7 to lie between the friction pad 7 and pistons 6. The shim plate 71 abuts annular contact parts 6A of the pistons 6. The shim plate 71 comprises two shim plate members, i.e. an outer shim plate member 72 and an inner shim plate member 73, which are separable from each other. The outer and inner shim plate members 72 and 73 are each formed from a metal plate, e.g. a steel plate (stainless steel plate), or a steel or other metal plate coated at both sides thereof with an elastic material, e.g. a hard rubber material or a resin material.

Of the outer and inner shim plate members 72 and 73, the outer shim plate member 72 is disposed closer to the pistons 6 than the inner shim plate member 73. The outer shim plate member 72 substantially comprises an abutting plate portion 72A, two inner claw portions 72B, and one outer claw portion 72C. The abutting plate portion 72A extends in the rotational direction of the disk 2 (in the direction of the arrow A) and constitutes the body portion of the outer shim plate member 72. The two inner claw portions 72B are integrally formed at the disk-radially inner end of the abutting plate portion 72A and engaged respectively with mounting grooves 9C of a backing plate 9. The outer claw portion 72C is integrally formed at the disk-radially outer end of the abutting plate portion 72A and engaged with an outer peripheral surface 9B of the backing plate 9. The abutting plate portion 72A is provided with a first one-side cut portion 74 and a first other-side cut portion 78 (described later) at respective positions corresponding to the annular contact parts 6A of the pistons 6.

The inner shim plate member 73, which is disposed closer to the friction pad 7 (backing plate 9), substantially comprises an abutting plate portion 73A, one inner claw portion 73B, and two outer claw portions 73C. The abutting plate portion 73A extends in the rotational direction of the disk 2 (in the direction of the arrow A) and constitutes the body portion of the inner shim plate member 73. The inner claw portion 73B is integrally formed at the disk-radially inner end of the abutting plate portion 73A and engaged with an inner peripheral surface 9A of a backing plate 9. The two outer claw portions 73C are integrally formed at the disk-radially outer end of the abutting plate portion 73A and engaged with the outer peripheral surface 9B of the backing plate 9. The abutting plate portion 73A is provided with a second one-side cut portion 75 and a second other-side cut portion 79 (described later) at respective positions corresponding to the annular contact parts 6A of the pistons 6.

The first and second one-side cut portions 74 and 75 are provided in the shim plate 71 at a position corresponding to the piston 6 located at the rotational entrance side (right side in FIG. 12), which is the entrance side in the rotational direction of the disk 2. The first and second one-side cut portions 74 and 75 are disposed on the rotational entrance side of a region of the shim plate 71 that corresponds to the annular contact part 6A of the rotational entrance-side piston 6, i.e. as shown in FIG. 12, on the rotational entrance side (right side) of a line segment X1-X1 extending in the diametrical direction of the disk 2 through the diametrical center O1 of the rotational entrance-side piston 6.

Of the first and second one-side cut portions 74 and 75, the first one-side cut portion 74 is provided in the abutting plate portion 72A of the outer shim plate member 72 at a position that is on the rotational entrance side (right side of the line segment X1-X1) of a region corresponding to the annular contact part 6A of the piston 6 and that is outer in the radial direction of the disk 2 than a line segment X2-X2 perpendicular to the line segment X1-X1. The first one-side cut portion 74 interposes (forms) a local gap between the abutting plate portion 73A of the inner shim plate member 73 and a portion of the annular contact part 6A of the piston 6 that is on the rotational entrance side thereof and that is outer in the radial direction of the disk 2 than the line segment X2-X2.

The second one-side cut portion 75 is provided in the abutting plate portion 73A of the inner shim plate member 73 at a position that is on the rotational entrance side (right side of the line segment X1-X1) of a region corresponding to the annular contact part 6A of the piston 6 and that is inner in the radial direction of the disk 2 than the line segment X2-X2. The second one-side cut portion 75 interposes (forms) a local gap between the backing plate 9 of the friction pad 7 and a portion oldie abutting plate portion 72A of the outer shim plate member 72 that corresponds to the rotational entrance side of the annular contact part 6A of the piston 6 and that is inner in the radial direction of the disk 2 than the line segment X2-X2.

That is, in this embodiment, local gaps are formed between the backing plate 9 of the friction pad 7 and the annular contact part 6A of the piston 6 at respective positions corresponding to the first and second one-side cut portions 74 and 75. Accordingly, the area of a part of the shim plate 71 at which the backing plate 9 of the friction pad 7 and the annular contact part 6A of the piston 6 contact each other through both the outer shim plate member 72 and the inner shim plate member 73, i.e. the area of a part of the shim plate 71 at which the backing plate 9 and the annular contact part 6A contact each other without through the gaps, which are formed to correspond to the first and second one-side cut portions 74 and 75, is larger at the rotational exit side (left side of the line segment X1-X1 in FIG. 12) than at the rotational entrance side (right side of the line segment X1-X1 in FIG. 12).

The first and second one-side cut portions 74 and 75 have four contact ends 76 at which the peripheries (peripheral edges) of the cut portions 74 and 75 and the annular contact part 6A of the piston 6 intersect each other. The four contact ends 76 are located on the rotational entrance side (right side of the line segment X1-X1 in FIG. 12) of a region of the shim plate 71 that corresponds to the annular contact part 6A of the piston 6.

A portion of the shim plate 71 that lies between the inner end (lower end in FIG. 12) of the first one-side cut portion 74 and the outer end (upper end in FIG. 12) of the second one-side cut portion 75 at a position corresponding to the annular contact part 6A of the piston 6 forms a rotational entrance-side contact portion 77 at which the backing plate 9 of the friction pad 7 and the annular contact part 6A of the piston 6 contact each other through both the abutting plate portion 72A of the outer shim plate member 72 and the abutting plate portion 73A of the inner shim plate member 73.

The rotational entrance-side contact portion 77 extends along a line segment X2-X2 perpendicular to the line segment X1-X1 extending in the diametrical direction of the disk 2 through the diametrical center O1 of the rotational entrance side-piston 6. In other words, of the four contact ends 76, two contact ends 76 located at both sides of the rotational entrance-side contact portion 77 face each other across the line segment X2-X2. Accordingly, when the brake is activated, the rotational entrance side (right side of the line segment X1-X1 in FIG. 12) of the annular contact part 6A of the piston 6 abuts the rotational entrance-side contact portion 77, which is a portion of the shim plate 71 lying between the two contact ends 76. Therefore, despite the fact that the cut portions 74 and 75 are provided respectively in the outer and inner shim plate members 72 and 73 constituting the shim plate 71, it is possible to suppress the piston 6 from tilting about the peripheral edge of the cut portion 74 or 75 because the piston 6 abuts the rotational entrance-side contact portion 77.

The first and second other-side cut portions 78 and 79 are provided in the shim plate 71 at a position corresponding to the piston 6 located at the rotational exit side (left side in FIG. 12), which is the exit side in the rotational direction of the disk 2. The first and second other-side cut portions 78 and 79 are provided on the rotational entrance side of a region of the shim plate 71 that corresponds to the annular contact part 6A of the rotational exit-side piston 6, i.e. as shown in FIG. 12, on the rotational entrance side (right side) of a line segment X1-X1 extending in the diametrical direction of the disk 2 through the diametrical center O1 of the rotational exit-side piston 6.

It should be noted that the first and second other-side cut portions 78 and 79 have the same structure and the same advantageous effects as those of the first and second one-side cut portions 74 and 75, except the difference as to whether the cut portions are provided to correspond to the rotational exit-side piston 6 or the rotational entrance-side piston 6. Therefore, the same constituent elements of the First and second other-side cut portions 78 and 79 as those of the first and second one-side cut portions 74 and 75 are denoted by the same reference numerals as used for the cut portions 74 and 75, and a further explanation thereof is omitted.

The disk brake according to this embodiment reduces brake noise, uneven wear of the friction pad, judder, and so forth by using the shim plate 11 (outer shim plate member 72 and inner shim plate member 73) provided with the cut portions 74, 75, 78 and 79 arranged as stated above and has no particular difference in the basic operation from the disk brake according to the foregoing first embodiment.

That is, according to this embodiment, the outer shim plate member 72 constituting the shim plate 71 is provided with the first one-side cut portion 74 and the first other-side cut portion 78, and the inner shim plate member 73 constituting the shim plate 71 is provided with the second one-side cut portion 75 and the second other-side cut portion 79. When the brake is activated, the rotational entrance side (right side of the line segment X1-X1 in FIG. 12) of the annular contact part 6A of each piston 6 abuts the rotational entrance-side contact portion 77, which is a portion of the shim plate 71 lying between the two contact ends 76. The rotational entrance-side contact portion 77 is a portion at which the backing plate 9 of the friction pad 7 and the annular contact part 6A of the piston 6 contact each other through both the abutting plate portion 72A of the outer shim plate member 72 and the abutting plate portion 73A of the inner shim plate member 73. Therefore, despite the fact that the cut portions 74, 75, 78 and 79 are provided in the shim plate 71, tilting of the piston 6 can be suppressed by the rotational entrance-side contact portion 77. Thus, it is possible to transmit the load from each piston 6 to the Friction pad 7 such that a reduced load is applied to the disk rotational entrance side of a region of the friction pad 7 that corresponds to the piston 6, and hence possible to reduce brake noise, uneven wear of the friction pad, judder, and so forth. As a result, it is possible to improve the brake performance, durability and stability of the disk brake.

Moreover, according to this embodiment, the first and second cut portions 74, 75, 78 and 79 are provided at both sides of a rotational entrance-side contact portion 77 corresponding to a position at which the rotational entrance side of the annular contact part 6A of each piston 6 abuts the shim plate 11. Therefore, when the brake is activated, the annular contact part 6A of each piston 6 surely abuts the associated rotational entrance-side contact portion 77. Thus, tilting of each piston 6 can be suppressed.

In the foregoing first to fifth embodiments, the present invention has been explained by way of an example in which the shim plate 11 is a stacked shim plate formed by bonding together the metal shim 11A and the elastic shim 11B, and the shim plate 11 is provided with the cut portions 13, 14, 17, 18, 31, 33, 41, 42, 43, 44, 51, 52, 53, 57, 58, 59, 61 and 63 by forming through-holes or cut-out portions in the metal shim 11A.

The present invention, however, is not limited to the above-described arrangement. For example, the arrangement may be such that the metal shim is not provided with through-holes or cut-out portions, but instead the elastic shim is provided with through-holes or Cut-out portions, thereby forming cut portions in the shim plate. It is also possible to form cut portions in the shim plate by providing through-holes or cut-out portions in both the metal shim and the elastic shim.

In other words, cut portions may be formed in the shim plate by providing through-holes or cut-out portions in at least either one of the metal and elastic shims. Further, the shim plate may be a single shim plate formed from one metal shim or one elastic shim. Alternatively, the shim plate may be a stacked shim plate formed by bonding together three or more shims (shim plate members). Further, the shim plate may be formed by simply superimposing two or more shims (shim plate members) on one another.

In the foregoing sixth embodiment, the present invention has been explained by way of an example in which the shim plate 71 comprises two separable shim plate members 72 and 73, and both the shim plate members 72 and 73 are provided with the cut portions 74, 75, 78 and 79.

The present invention, however, is not limited to the above-described arrangement. For example, the two shim plate members may be inseparably bonded together. Further, only one of the two shim plate members may be provided with cut portions. The shim plate may be formed from one shim plate member. It is also possible to form the shim plate from three or more shim plate members.

In the foregoing first embodiment, the present invention has been explained by way of an example in which all the four contact ends 15 are provided on the rotational entrance side of the diametrical center O1 of the piston 6. In the foregoing second embodiment, the present invention has been explained by way of an example in which, of the four contact ends 15 and 32, three contact ends 15 are provided on the rotational entrance side of the diametrical center O1 of the piston 6. The present invention, however, is not limited to the above-described arrangements. For example, two of the four contact ends may be provided on the rotational entrance side. That is, at least two contact ends may be provided on the rotational entrance side of the diametrical center of the piston.

In the foregoing embodiments, the present invention has been explained by way of an example in which four to six contact ends 15, 32, 54, 62 and 76 are provided. The present invention, however, is not limited to the above-described arrangement. For example, four or more cut portions may be provided to provide eight or more contact ends. That is, at least four contact ends may be provided.

In the foregoing embodiments, the present invention has been explained by way of an example in which a piston 6 having a circular cross-sectional configuration is used. The present invention, however, is not limited to the above-described arrangement. For example, it is also possible to use a non-circular piston having an elliptical or other non-circular cross-sectional configuration.

In the foregoing embodiments, the present invention has been explained by way of an example in which two pistons 6 are provided in the inner leg portion 3A of the caliper body 3. The present invention, however, is not limited to the above-described arrangement. For example, the arrangement may be such that only one piston is provided in the inner leg portion of the caliper body. Alternatively, three or more pistons may be provided in the inner leg portion of the caliper body.

In the foregoing embodiments, the present invention has been explained in regard to a floating caliper type disk brake, by way of example, in which a piston 6 is slidably provided in the inner leg portion 3A of the caliper body 3 through a cylinder 4, and the outer leg portion 3C of the caliper body 3 is abutted against the outer friction pad 21. The present invention, however, is not limited to the above-described arrangement. For example, the present invention is also applicable to an opposed-piston type disk brake having pistons provided on the inner and outer sides, respectively, oldie caliper body.

According to the foregoing embodiments, at least two of the contact ends of the cut portions are provided on the entrance side in the direction of rotation of the disk when the vehicle travels forward. Therefore, when the brake is activated, a portion of the shim plate that lies between the two contact ends and the annular contact part of the piston abut each other, thereby suppressing tilting of the piston. Accordingly, it is possible to transmit the load from the piston to the friction pad such that a reduced load is applied to the disk rotational entrance side of a region of the friction pad that corresponds to the piston, and hence possible to reduce brake noise, uneven wear of the friction pad, judder, and so forth. As a result, it is possible to improve the brake performance, durability and stability of the disk brake.

Moreover, according to the embodiments, at least two pistons are provided in the caliper body, and cut portions are provided for each of the pistons. Therefore, tilting of any of a plurality of pistons can be suppressed by the cut portions. Accordingly, even in a structure in which at least two pistons are provided in the caliper body, it is possible to transmit the load from each piston to the friction pad such that a reduced load is applied to the disk rotational entrance side of a region of the friction pad that corresponds to the piston, and hence possible to reduce brake noise, uneven wear of the friction pad, judder, and so forth. As a result, it is possible to improve the brake performance, durability and stability of the disk brake.

Further, according to the embodiments, cut portions are provided at both sides of a portion of the shim plate corresponding to a position where the annular contact pail of the piston and the shim plate abut each other at the rotational entrance side of the annular contact part. Therefore, the portion of the shim plate that lies between the cut portions abuts the annular contact part of the piston. In addition, the distribution of load (surface pressure distribution) applied to the friction pad can be adjusted (tuned) over a wide range by properly setting the size of the cut portions (size of the abutting portion). Consequently, tilting of the pistons can be suppressed even more surely, and it is possible to further improve the brake performance, durability and stability of the disk brake.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2011-165538, filed on Jul. 28, 2011. The entire disclosure of Japanese Patent Applications No. 2011-165538, filed on Jul. 28, 2011 including specification, claims, drawings and summary is incorporated herein by reference in its entirety.

What is claimed is:

1. A disk brake comprising:
a caliper body extending over an outer periphery of a disk that rotates together with a wheel of a vehicle;
a piston projectable from the caliper body in an axial direction of the disk and having an annular contact part at an end thereof at which the piston is projectable;
a friction pad that is pressed against the disk by the piston; and
a shim plate provided at a rear side of the friction pad to abut the annular contact part;
the annular contact part having a diameter smaller than a diametrical length and circumferential length of the shim plate;
the shim plate being provided with a plurality of cut portions so that an area of contact between the shim plate and the annular contact part is larger at a disk rotational exit side than at a disk rotational entrance side in a direction of rotation of the disk when the vehicle travels forward;

the plurality of the cut portions having at least four contact ends at which peripheries of the cut portions and the annular contact part intersect each other;

at least two of the at least four contact ends being provided on a disk rotational entrance side of the shim plate with respect to a diametrical center of the piston.

2. The disk brake of claim 1, wherein there are at least two of the pistons provided in the caliper body;

the plurality of the cut portions being provided for each of the pistons.

3. The disk brake of claim 1, wherein the cut portions are provided at both sides of a portion of the shim plate that abuts the annular contact part at a disk rotational entrance side.

4. The disk brake of claim 1, wherein a partition is provided between at least two of the at least four contact ends, the partition being abutted by the annular contact part.

5. The disk brake of claim 4, wherein the partition extends in a longitudinal direction of the friction pad.

6. The disk brake of claim 4, wherein the partition is provided at a position displaced from a longitudinal axis of the friction pad extending through the diametrical center of the piston, inward in a radial direction of the disk.

7. The disk brake of claim 1, wherein the shim plate is formed from a plurality of stacked shims;

the cut portions being formed in a shim of the stacked shims that abuts the annular contact part.

8. A disk brake comprising:

a caliper body extending over an outer periphery of a disk that rotates together with a wheel of a vehicle;

at least two pistons projectable from the caliper body in an axial direction of the disk and each having an annular contact part at an end thereof at which the piston is projectable;

a single friction pad that is pressed against the disk by the at least two pistons; and a single shim plate provided at a rear side of the friction pad to abut the annular contact part of each of the pistons:

the annular contact part having a diameter smaller than a diametrical length and circumferential length of the shim plate;

the shim plate being provided with a plurality of cut portions for each of the pistons so that an area of contact between the shim plate and the annular contact part is larger at a disk rotational exit side than at a disk rotational entrance side in a direction of rotation of the disk when the vehicle travels forward;

the plurality of the cut portions having at least four contact ends for each of the two pistons at which peripheries of the cut portions and the annular contact part of each or the pistons intersect each other;

at least two of the at least four contact ends provided for each of the pistons being provided on a disk rotational entrance side of the shim plate with respect to a diametrical center of the piston.

9. The disk brake of claim 8, wherein the cut portions are provided at both sides of a portion of the shim plate that corresponds to a portion of the annular contact part that abuts the shim plate at a disk rotational entrance side of the annular contact part.

10. The disk brake of claim 8, wherein a partition is provided between at least two of the at least four contact ends, the partition being abutted by the annular contact part.

11. The disk brake of claim 10, wherein the partition extends in a longitudinal direction of the friction pad.

12. The disk brake of claim 10, wherein the partition is provided at a position displaced from a longitudinal axis of the friction pad extending through the diametrical center of the piston, inward in a radial direction of the disk.

13. The disk brake of claim 8, wherein the shim plate is formed from a plurality of stacked shims;

the cut portions being formed in a shim of the stacked shims that abuts the annular contact part.

14. The disk brake of claim 8, wherein the shim plate comprises two shims superimposed each other, a first shim of the two shims being provided with first cut portions of the plurality of the cut portions for each of the two pistons a second shim of the two shims being provided with second cut portions of the plurality of the cut portions for each of the two pistons, the second cut portions being provided at positions at which the second cut portions and the first cut portions do not overlap in a circumpherencial direction of the piston.

15. A disk brake comprising:

a caliper body supporting two pistons juxtaposed in a rotational direction of a disk that rotates together with a wheel of a vehicle, the pistons each having an annular contact part at a distal end thereof that faces the disk, the pistons being projectable in an axial direction of the disk, the caliper body extending over an outer periphery of the disk;

a friction pad disposed between the two pistons on one hand and the disk on the other; and a shim plate disposed at a side of the friction pad closer to the two pistons, the shim plate being abutted by the annular contact part of each of the pistons;

the shim plate having a diametrical length and a circumferential length that are large enough for the shim plate to extend beyond outer peripheral edges of the annular contact parts of the two pistons;

the shim plate being provided with cut portions for each of the pistons so that an area of contact between the annular contact part of the piston and a portion of the shim plate that is located on a disk rotational exit side with respect to a diametrical center of the piston in a direction of rotation of the disk when the vehicle travels forward is larger than an area of contact between the annular contact part and a portion of the shim plate that is located on a disk rotational entrance side with respect to the diametrical center of the piston;

the cut portions being provided at both sides of a portion of the shim plate that abuts the annular contact part at a disk rotational entrance side.

16. The disk brake of claim 15, wherein the shim plate is formed from a plurality of stacked shims;

the cut portions being formed in a shim of the stacked shims that abuts the annular contact part.

* * * * *